United States Patent
Abe

(10) Patent No.: US 7,167,254 B1
(45) Date of Patent: Jan. 23, 2007

(54) SCANNING SYSTEM, ITS CONTROL METHOD, AND STORAGE MEDIUM

(75) Inventor: Koichi Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/334,510

(22) Filed: Jun. 21, 1999

(30) Foreign Application Priority Data

Jun. 26, 1998 (JP) .................................. 10-181106

(51) Int. Cl.
*G06F 15/00* (2006.01)
*B41J 2/145* (2006.01)

(52) U.S. Cl. .................. 358/1.15; 358/1.15; 347/40

(58) Field of Classification Search ............... 358/1.15, 358/400, 448, 445, 446, 1.9, 1.16, 296; 347/109, 347/19, 40, 9, 43, 104; 399/8, 9, 284; 719/321, 719/327; 370/204, 338; 713/176, 190
See application file for complete search history.

(56) References Cited

U.S. PATENT DOCUMENTS

| | | | | |
|---|---|---|---|---|
| 5,499,108 A | * | 3/1996 | Cotte et al. | 358/400 |
| 5,842,793 A | * | 12/1998 | Katayama et al. | 400/88 |
| 5,987,186 A | * | 11/1999 | Oida et al. | 382/274 |
| 6,155,665 A | * | 12/2000 | Lee | 347/19 |
| 6,236,471 B1 | * | 5/2001 | Lee | 358/474 |
| 6,334,665 B1 | * | 1/2002 | Yoshida | 347/40 |

FOREIGN PATENT DOCUMENTS

| | | |
|---|---|---|
| JP | 6-176114 | 6/1994 |
| JP | A 8-183173 | 7/1996 |
| JP | 9-39218 | 2/1997 |
| JP | 9-91241 | 4/1997 |

\* cited by examiner

*Primary Examiner*—Mark Wallerson
*Assistant Examiner*—Saeid Ebrahimi-Dehkordy
(74) *Attorney, Agent, or Firm*—Morgan & Finnegan, LLP

(57) ABSTRACT

This invention has as its object to provide an image scanning system which has both a printer function and image scanning function but allows simple operation for scanning an image. In order to achieve this object, a system has a print device with a scanner function, which allows printing and scanning by selectively mounting a print head and scan head on a head mounting portion, and a host computer which is connected to the print device to be able to communicate with it, and includes a scanner driver which can control scanning of the print device. When the scan head is mounted on the head mounting portion in a state an original to be scanned is prepared on the print device, the print device communicates with the host computer to start the scanner driver and to read an image of the original into the scanner driver.

12 Claims, 10 Drawing Sheets

SCANNING SYSTEM, ITS CONTROL METHOD, AND STORAGE MEDIUM

BACKGROUND OF THE INVENTION

The present invention relates to a scanning system having a print function and an original scanning function, its control method, and a storage medium.

Conventionally, a flatbed scanner device having an image scanning function has prevailed as a personal computer peripheral device. Recently, a scanner device that uses a sheet scanning scheme has been developed. Furthermore, a new device obtained by improving an ink-jet printer device to implement a scanning function has been developed. This printer device mounts a detachable scanner cartridge in place of a detachable ink-jet cartridge to implement the scanning function.

Each of such scanner devices is controlled by a scanner driver, which is dedicated to that scanner device and installed in a personal computer, so as to scan an image.

However, in the conventional scanner device, after the user starts a scanner driver dedicated to that scanner driver on a personal computer, prepares for an original, and operates the scanner driver, the original image can be scanned. Hence, operations for scanning an image required for the user are very troublesome.

In order to solve this problem, the user interfaces in the scanner devices are improving day by day. For example, in the flatbed scanner device, a hardware switch for starting the scanner driver is provided to the scanner device main body. When this switch is pressed after an original is prepared, the scanner driver is started.

On the other hand, the sheet scanning type scanner device has an original sensor (switch). When an original is inserted, the sensor detects the original, and the scanner driver is started in response to that detection.

However, in the device which is obtained by improving an ink-jet printer device to implement the scanning function, and is mentioned last in the prior art above, it is hard to improve its user interface in terms of its arrangement, and in order to use that device as a scanner device, the user must:

(1) replace the ink-jet cartridge by the scanner cartridge;
(2) start the scanner driver on the personal computer;
(3) prepare for an original; and
(4) operate the scanner driver to scan an original image.

In this manner, operations for scanning an image, required for the user are very cumbersome.

SUMMARY OF THE INVENTION

The present invention has been made in consideration of the above problems, and has as its object to provide an image scanning system which allows simple image scanning operation although it has both a printer function and image scanning function, its control method, and a storage medium.

In order to solve the above problems and to achieve the above object, a scanning system according to the present invention is characterized by the following arrangement according to its first aspect.

That is, there is provided a scanning system comprising: a print device with a scanner function, which allows printing and scanning by selectively mounting a print head and scan head on a head mounting portion; and an external computer which is connected to the print device to be able to communicate therewith, and comprises a scanner software for controlling scanning of the print device, wherein when the scan head is mounted on the head mounting portion and a predetermined preparation is detected, the print device communicates with the external computer to start the scanner software.

A scanning system according to the present invention is characterized by the following arrangement according to its second aspect.

That is, there is provided a scanning system comprising: a print device with a scanner function, which allows printing and scanning by selectively mounting a print head and scan head on a head mounting portion; and an external computer which is connected to the print device to be able to communicate therewith, and comprises a scanner software for controlling scanning operation of the print device, wherein when the scan head is mounted on the head mounting portion and an original is set on the print device, the print device communicates with the external computer to start the software.

A scanning system according to the present invention is characterized by the following arrangement according to its third aspect.

That is, there is provided a scanning system comprising: a print device with a scanner function, which allows printing and scanning by selectively mounting a print head and scan head on a head mounting portion; and an external computer which is connected to the print device to be able to communicate therewith, and comprises a scanner software which can control scanning of the print device, and an application software which can edit an image scanned from the print device, wherein when the scan head is mounted on the head mounting portion and an original is set on the print device and the application software is running, the print device communicates with the external computer to start the scanner software, to read an image of the original into the scanner software, and to transfer the read image to the application software.

A method of controlling a scanning system according to the present invention is characterized by the following arrangement according to its first aspect.

That is, there is provided a method of controlling a scanning system, which comprises a print device with a scanner function, which allows printing and scanning by selectively mounting a print head and scan head on a head mounting portion, and an external computer which is connected to the print device to be able to communicate therewith, and comprises a scanner software which can control scanning of the print device, comprising the step of: controlling the print device to communicate with the external computer so as to start the scanner software, when the scan head is mounted on the head mounting portion and a predetermined preparation is detected.

A method of controlling a scanning system according to the present invention is characterized by the following arrangement according to its second aspect.

That is, there is provided a method of controlling a scanning system, which comprises a print device with a scanner function, which allows printing and scanning by selectively mounting a print head and scan head on a head mounting portion, and an external computer which is connected to the print device to be able to communicate therewith, and comprises a scanner software which can control scanning of the print device, comprising the step of: controlling the print device to communicate with the external computer so as to start the scanner software and to read an image of the original into the scanner software, when the scan head is mounted on the head mounting portion and an original is set on the print device.

A method of controlling a scanning system according to the present invention is characterized by the following arrangement according to its third aspect.

That is, there is provided a method of controlling a scanning system, which comprises a print device with a scanner function, which allows printing and scanning by selectively mounting a print head and scan head on a head mounting portion, and an external computer which is connected to the print device to be able to communicate therewith, and comprises a scanner software which can control scanning of the print device, and an application software which can edit an image scanned from the print device, comprising the step of: controlling the print device to communicate with the external computer so as to start the scanner software, to read an image of the original into the scanner software, and to transfer the read image to the application software, when the scan head is mounted on the head mounting portion and an original is set on the print device and the application software is running.

A storage medium according to the present invention is characterized by the following arrangement according to its first aspect.

That is, there is provided a storage medium that stores a control program for controlling a scanning system, which comprises a print device with a scanner function, which allows printing and scanning by selectively mounting a print head and scan head on a head mounting portion, and an external computer which is connected to the print device to be able to communicate therewith, and comprises a scanner software which can control scanning of the print device, the control program comprising: a code of the step of controlling the print device to communicate with external computer so as to start the scanner software, when the scan head is mounted on the head mounting portion.

A storage medium according to the present invention is characterized by the following arrangement according to its second aspect.

That is, there is provided a storage medium that stores a control program for controlling a scanning system, which comprises a print device with a scanner function, which allows printing and scanning by selectively mounting a print head and scan head on a head mounting portion, and an external computer which is connected to the print device to be able to communicate therewith, and comprises a scanner software which can control scanning of the print device, the control program comprising: a code of the step of controlling the print device to communicate with the external computer so as to start the scanner software and to read an image of the original into the scanner software, when the scan head is mounted on the head mounting portion and an original is set on the print device.

A storage medium according to the present invention is characterized by the following arrangement according to its third aspect.

That is, there is provided a storage medium that stores a control program for controlling a scanning system, which comprises a print device with a scanner function, which allows printing and scanning by selectively mounting a print head and scan head on a head mounting portion, and an external computer which is connected to the print device to be able to communicate therewith, and comprises a scanner software which can control scanning of the print device, and an application which can edit an image scanned from the print device, the control program comprising: a code of the step of controlling the print device to communicate with the external computer so as to start the scanner software, to read an image of the original into the scanner software, and to transfer the read image to the application software, when the scan head is mounted on the head mounting portion and an original is set on the print device and the application software is running.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

The preferred embodiment of the present invention will be described in detail hereinafter with reference to the accompanying drawings.

Figure 1:
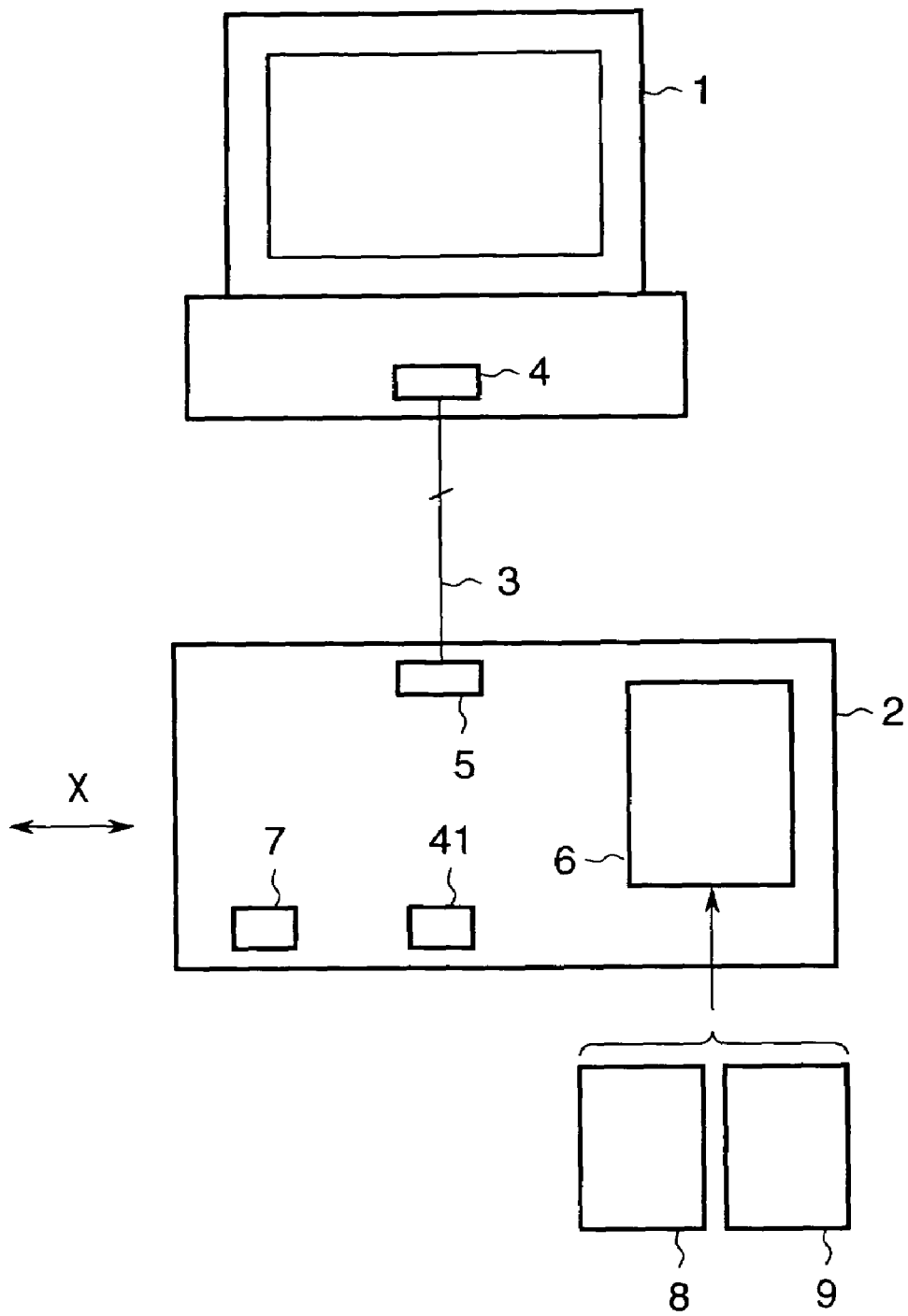
FIG. 1 is a block diagram showing the arrangement of a scanning system according to an embodiment of the present invention.

FIG. 1 is a block diagram showing the arrangement of a scanning system according to an embodiment of the present invention.

Referring to FIG. 1, reference numeral 1 denotes a display integrated personal computer, in which Microsoft Windows95 is installed as an OS. Reference numeral 2 denotes an ink-jet printer which can detachably mount a head integrated ink cartridge 8. The ink cartridge 8 is mounted on a carriage 6. The printer 2 can provide a scanner function by mounting a scanner cartridge 9 on the carriage 6 in place of the ink cartridge 8 (the printer 2 will be referred to as a scanner/printer hereinafter).

Reference numerals 4 and 5 denotes bi-directional parallel interface ports. Bi-directional parallel communications are made between the personal computer 1 and scanner/printer 2 via a parallel interface cable 3.

Reference numeral 7 denotes a cartridge exchange button upon replacing the ink or scanner cartridge 8 or 9. Upon depression of this button, the carriage 6 moves to a cartridge exchange position, and the user can freely exchange cartridges in this state.

Reference numeral 41 denotes a sensor for detecting print sheets or originals. In the printer mode in which the ink cartridge 8 is mounted on the carriage 6, the sensor 41 detects the presence/absence of print sheets. On the other hand, in the scanner mode in which the scanner cartridge 9 is mounted on the carriage 6, the sensor 41 detects the presence/absence of originals (in both modes, an identical sheet path is used). The carriage 6 moves in the X-direction in FIG. 1 to print or scan an image.

Figure 2:
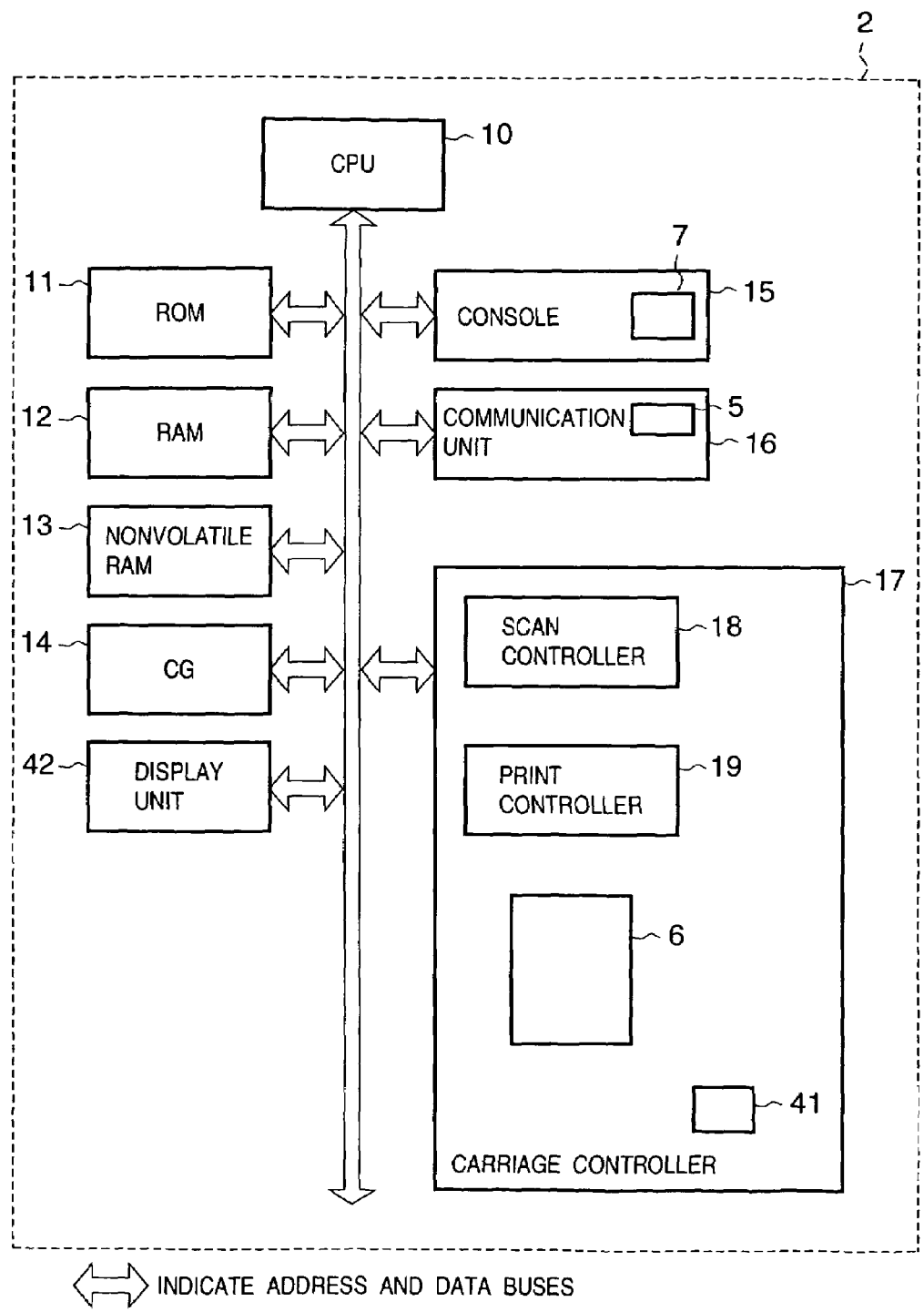
FIG. 2 is a block diagram showing the arrangement of a scanner/printer.

FIG. 2 is a block diagram showing the arrangement of the scanner/printer 2.

Referring to FIG. 2, reference numeral 10 denotes a CPU comprising, e.g., a microcomputer and the like. The CPU 10 controls a RAM 12, a nonvolatile RAM 13 for storing user data and other most important data, a character generator (CG) 14, a console 15, a communication unit 16, a carriage controller 17, and a display unit 42 comprising LEDs, a buzzer, and the like in accordance with a program stored in a ROM 11.

The carriage controller 17 discriminates if the ink or scanner cartridge 8 or 9 is mounted on the carriage 6, by detecting an ID stored in the ink or scanner cartridge 8 or 9. When the ink cartridge 8 is mounted, a print controller 19 controls printing (printer mode); when the scanner cartridge 9 is mounted, a scan controller 18 controls scanning (scanner mode).

The port 5 shown in FIG. 1 is included in the communication unit 16, which controls bi-directional parallel communications between the personal computer 1 and scanner/printer 2 while complying with IEEE P1284 as the standards for Standard Signaling Method for a Bi-directional Parallel Peripheral Interface for Personal Computers.

The RAM 12 stores print data sent from the personal computer 1, or image data which is scanned via the scanner cartridge 9 under the control of the scan controller 18, and is sent from the carriage controller.

The nonvolatile RAM 13 reliably stores the most important data (e.g., ink remaining amount data of the ink cartridge 8, etc.) to be saved even when the power supply of the scanner/printer 2 (a power supply unit is not shown in this embodiment) is kept OFF.

The character generator 14 is a ROM that stores characters of JIS codes, ASCII codes, and the like, and various fonts, and outputs 1- or 2-byte character data corresponding to a predetermined code as needed under the control of the CPU 10.

The scan controller 18 comprises, e.g., a DMA controller, image processing IC, CMOS logic IC, and the like, converts data scanned using the scanner cartridge 9 under the control of the CPU 10 into multi-value or binary data, and sequentially sends that data to the RAM 12.

The print controller 19 comprises a DMA controller, ink-jet print control IC, CMOS logic IC, and the like, reads out print data stored in the RAM 12 under the control of the CPU 10, and prints it out as a hard copy.

The carriage controller 17 has the sensor 41 shown in FIG. 1 to detect the presence/absence of print sheets or originals, and executes print or scan control on the basis of this detection result.

The console 15 comprises a power switch (not shown), reset switch (not shown), cartridge exchange button 7, and the like, which can be freely operated by the user.

The display unit 42 comprises LEDs (not shown), and the like, and informs the user of the state of the scanner/printer 2 during operation.

Figure 3:
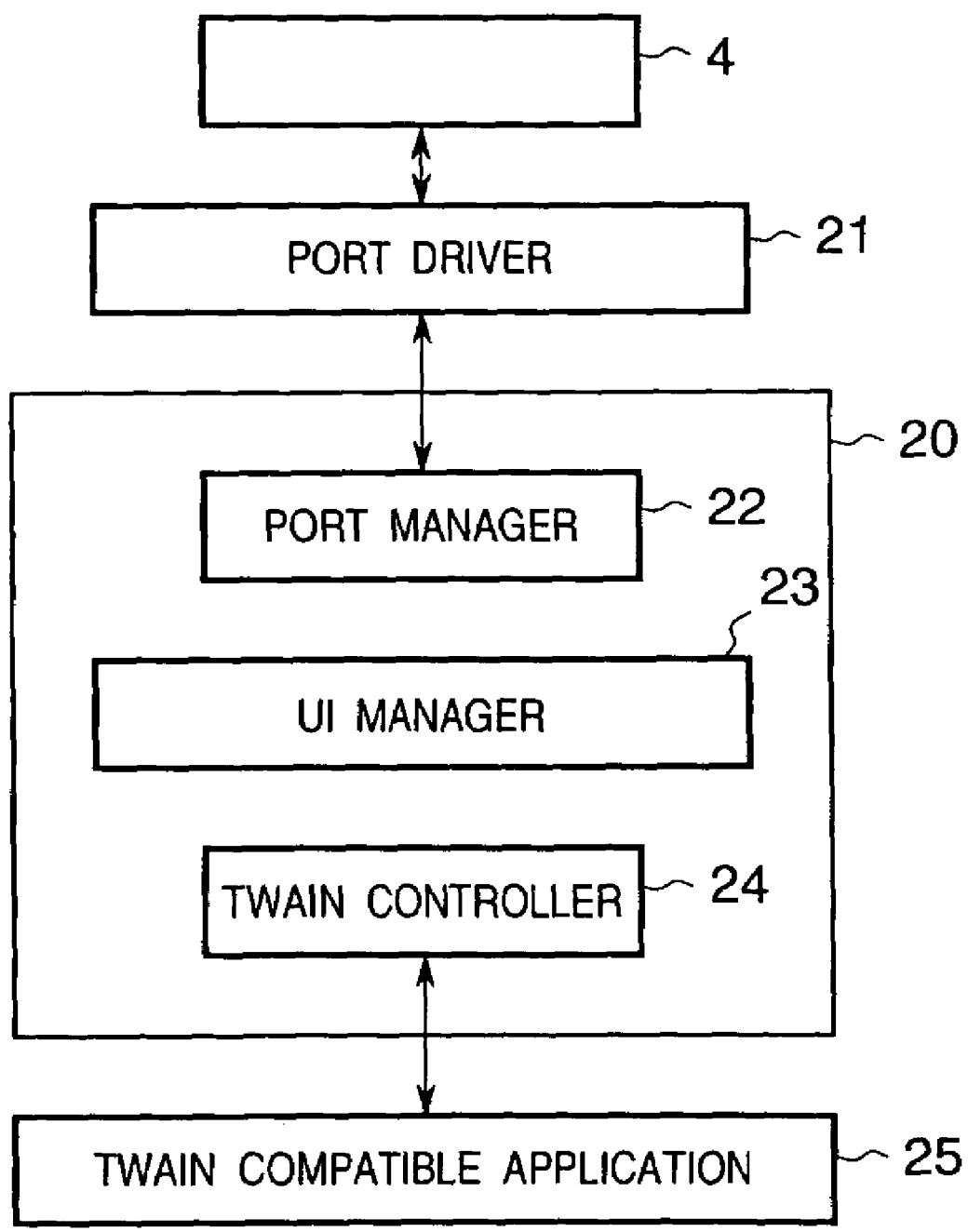
FIG. 3 is a block diagram of a scanner driver and its interface.

FIG. 3 is a block diagram of the scanner driver for controlling the scanner/printer 2 from the personal computer 1 in the scanner mode, and its interface.

In FIG. 3, the OS intervenes in these functions in practice, but is not shown in this embodiment. Referring to FIG. 3, reference numeral 20 denotes a scanner driver for controlling the scanner/printer 2 in the scanner mode. The scanner driver 20 comprises a port manager 22, UI manager 23, and TWAIN controller 24.

A port driver 21 is a module provided by the OS, and exchanges data by controlling the port 4 shown in FIG. 1. The port manager 22 controls the port driver 21 mainly in accordance with an instruction from the UI manager 23. As will be described later, the port manager 22 monitors asynchronous status sent from the scanner/printer 2 by controlling the port driver 21. Upon receiving scanner start status, the port manager 22 starts the UI manager 23 and TWAIN controller 24. Note that asynchronous status is a status command sent from the scanner/printer 2 to the personal computer 1 (the scanner driver 20 in practice) when the scanner/printer 2 has undergone some status change.

The port manager 22 is immediately started upon starting the OS irrespective of the running states of other modules (UI manager 23 and TWAIN controller 24), and resides in the memory of the personal computer 1. The port manger 22 has a very small module size since it executes simple processes, and does not adversely influence other applications and the like even when it resides in the memory.

The UI manager 23 is a module which has a user interface, controls it, and exchanges commands with the scanner/printer 2 to control it. The UI manager 23 controls the user interface (Main Dialog Box to be described later) and scanner/printer 2 on the basis of user's operations and information from the port manager 22.

The TWAIN controller 24 transfers image data captured from the scanner/printer 2 into the scanner driver 20 to a TWAIN compatible application 25 while complying with an API (TWAIN) between an application and image input device, which is specified by the TWAIN Working group. Also, the TWAIN compatible application 25 can start the scanner driver 20 via the TWAIN controller 24. Furthermore, the TWAIN controller 24 can recognize a TWAIN environment in which the TWAIN compatible application 25 (to be described later) is running, and can inform the UI manager 23 of this environment information under the control of the UI manager 23.

The TWAIN compatible application 25 is an arbitrary image edit application that supports the TWAIN, and this embodiment uses TWAIN_32 Twacker provided by the TWAIN Working group as the application 25.

In this embodiment, there are roughly two environments in which the UI manager 23 and TWAIN controller 24 are started. In one environment, the TWAIN compatible application 25 is running (to be referred to as a TWAIN environment hereinafter). In the other environment, the TWAIN compatible application 25 is not started (to be referred to as a non-TWAIN environment hereinafter).

Figure 4:
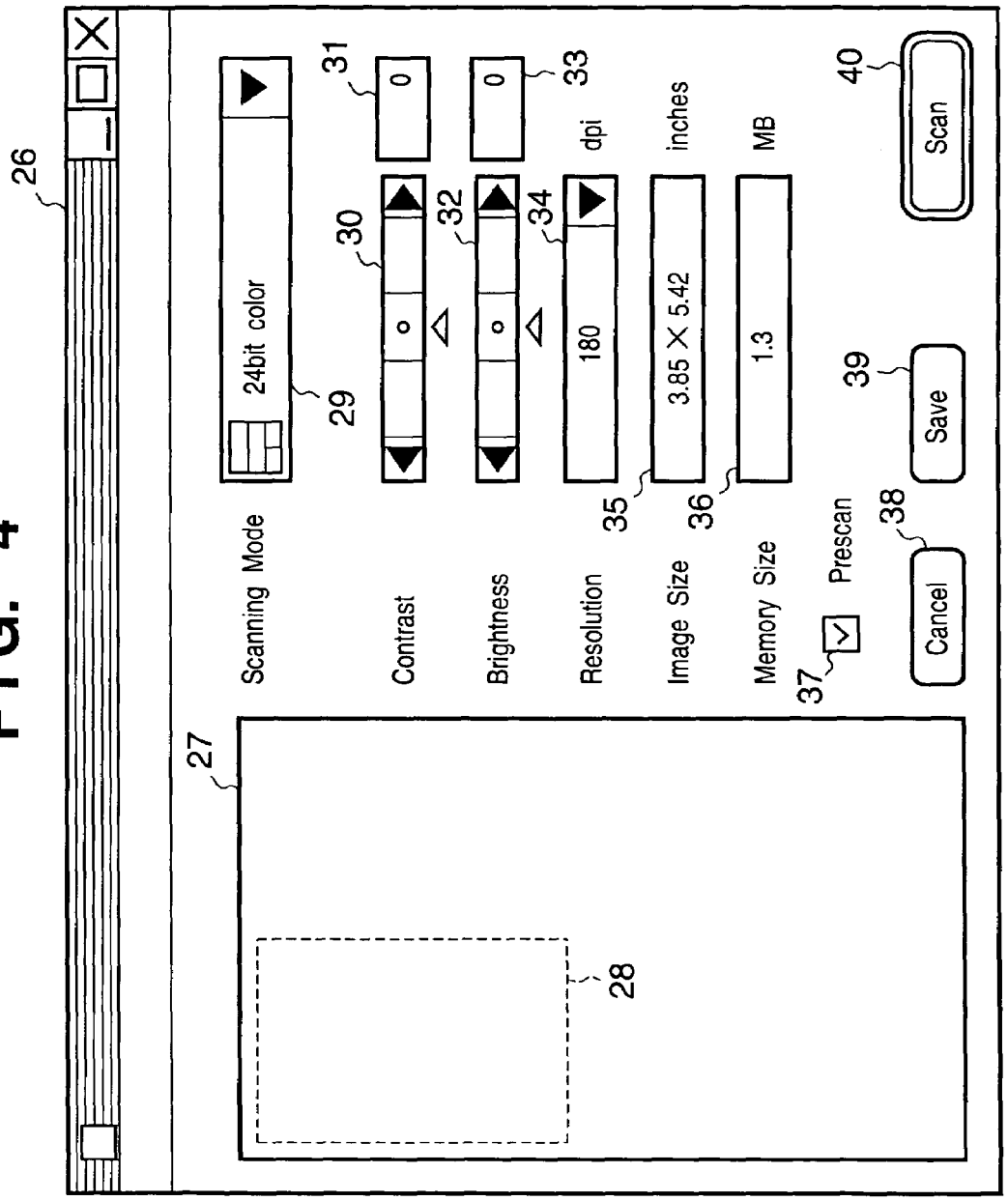
FIG. 4 shows a Main Dialog Box.

FIG. 4 shows a Main Dialog Box as a user interface.

Referring to FIG. 4, reference numeral 26 denotes a Main Dialog Box which determines the image scanning method, resolution, and the like in the scanner/printer 2 in accordance with user's operations, and starts or stops scanning. The Main Dialog Box 26 includes a preview area 27, scan range 28, Scanning Mode adjuster 29, Contrast adjusting slider 30, Contract adjusting text box 31, Brightness adjusting slider 32, Brightness adjusting text box 33, Resolution adjuster 34, Image Size indicator 35, Memory Size indicator 36, Prescan check box 37, Cancel button 38, Save button 39, and Scan button 40.

The preview area 27 displays a prescanned or main-scanned image. The scan range 28 is a range designation tool for arbitrarily setting an actual scan range within a scannable range.

The Scanning Mode Adjuster 29 has a popup menu, which allows the user to select a scanning method from 24-bit color, 8-bit grayscale, and monochrome binary modes. In FIG. 4, the 24-bit color mode is selected.

The Contrast adjusting slider 30 can adjust the contrast of the scanned image by adjusting its slider. At this time, the contrast adjusting value is indicated in the Contrast adjusting text box 31. The contrast can also be adjusted by directly inputting an adjusting value in the text box 31. In this case, the position of the slider 30 moves in correspondence with the input adjusting value. In FIG. 4, a default state (no adjustment) is selected.

The Brightness adjusting slider 32 can adjust the brightness of the scanned image by adjusting its slider. The Brightness adjusting value at that time is indicated in the Brightness adjusting text box 33. The brightness can also be adjusted by directly inputting an adjusting value in the text box 33. In this case, the position of the slider 32 moves in correspondence with the input adjusting value. In FIG. 4, a default state (no adjustment) is selected.

The Resolution adjuster 34 has a popup menu, which allows the user to select a scan resolution from 90 dpi, 180 dpi, and 360 dpi. In FIG. 4, 180 dpi is selected.

The Image Size indicator 35 indicates a vertical×horizontal size (inches) designated by the scan range 38.

The Memory Size indicator 36 indicates the image data size when an image is actually scanned under the condition defined by these setup values.

The Prescan check box 37 is used for determining if a prescan is done. If the check box 37 is checked upon depression of the Scan button 40, a prescan is done; if it is not checked, a prescan is not done. When the check box 37 is checked upon depression of the Scan button 40, the check box 37 goes gray-out upon completion of the prescan, and is invalidated. The Scan button 40 is used for starting a prescan or main scan.

The Cancel button 38 is used for canceling a prescan or main scan. When the button 38 is pressed during the prescan or main scan, the prescan or main scan is canceled.

The Save button 39 may go valid only in the non-TWAIN environment, and stays valid when a main-scanned image is displayed on the preview area 27 (invalid in other cases since it goes gray-out). When the button 39 is pressed while a main-scanned image is displayed on the preview area 27, the main-scanned image is saved in a file.

Figure 5:
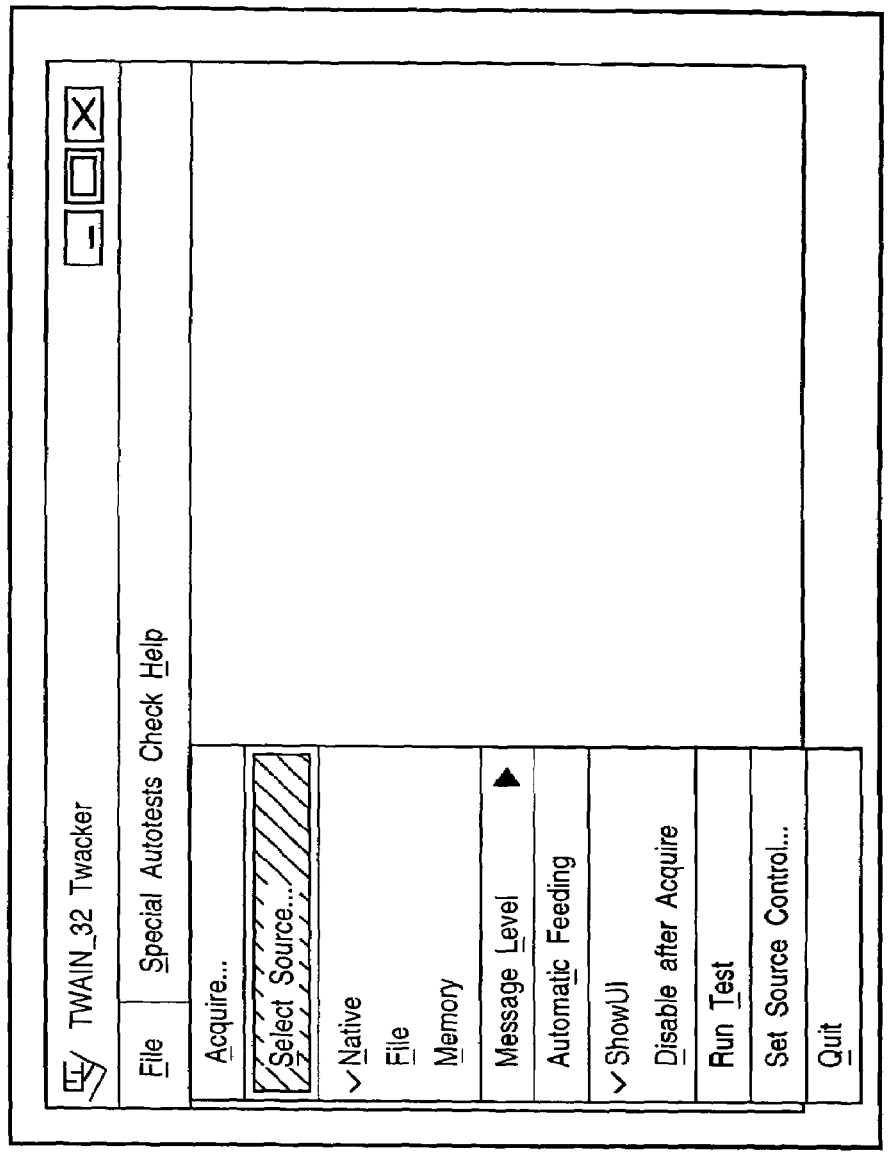
FIG. 5 shows File menus displayed when TWAIN_32 Twacker as a TWAIN compatible application is running.

FIG. 5 shows a File menu while TWAIN_32 Twacker as the TWAIN compatible application 25 is running. The operations executed until a TWAIN compatible device is started from the TWAIN compatible application will be explained below with reference to FIG. 5.

Referring to FIG. 5, the user selects in advance the scanner driver 20 as a TWAIN compatible device by clicking "Select Source . . . ". Normally, the scanner driver 20 is started as the TWAIN compatible device by then clicking "Acquire . . . ". In this embodiment, assume that the TWAIN environment is established, and the scanner driver 20 is selected as the TWAIN compatible device from "Select Source . . . ".

FIGS. 6, 7, 8, 9, and 10 are flow charts showing the operations of this embodiment, and the operations will be explained below using these drawings.

Figure 6:
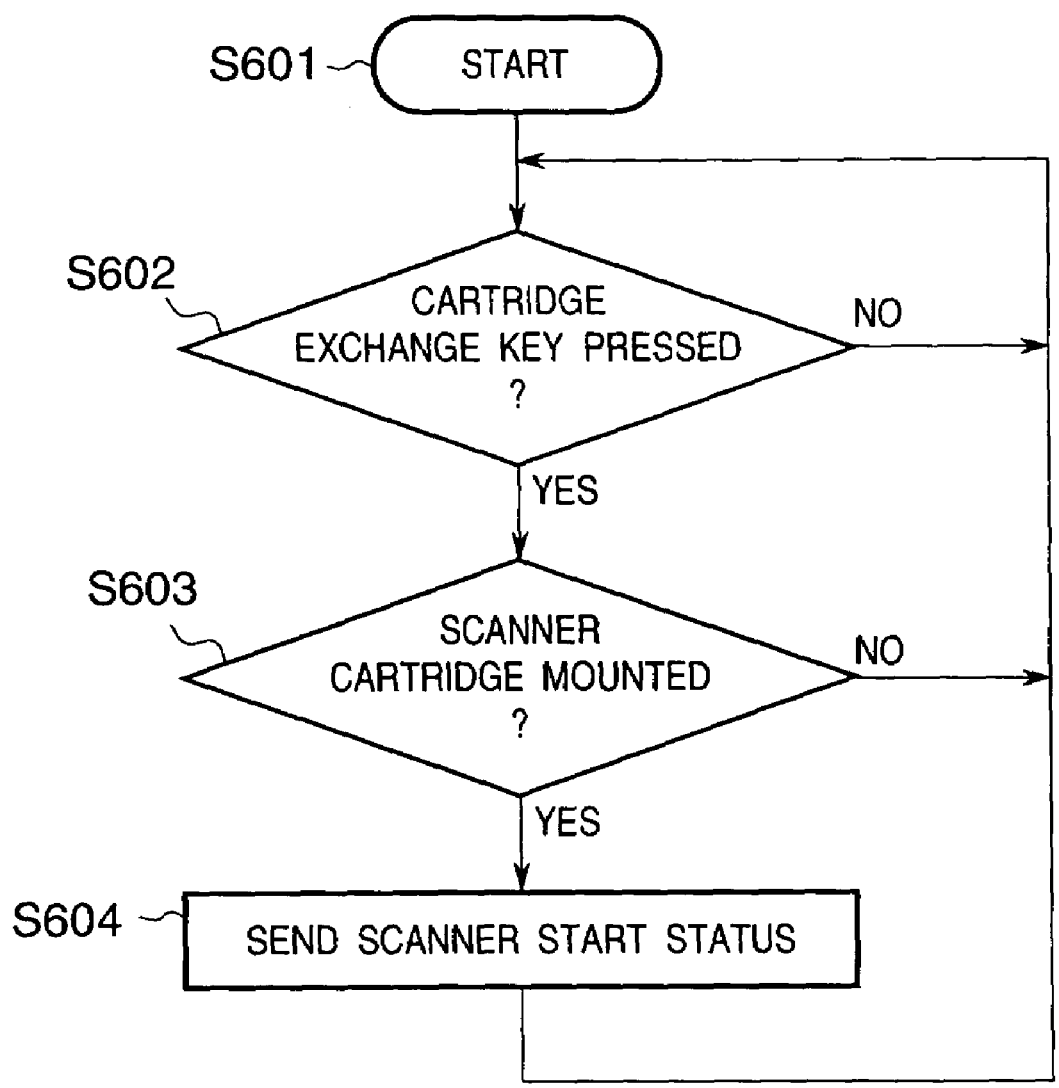
FIG. 6 is a flow chart showing detection of a scanner cartridge in the scanner/printer and subsequent operations.

FIG. 6 is a flow chart showing detection of the scanner cartridge 9 and the subsequent operations in the scanner/printer 2.

Referring to FIG. 6, assume that the ink cartridge 8 is mounted on the carriage 6 at the time of start (S601). When the user presses the cartridge exchange button 7 (S602), detaches the ink cartridge 8, and mounts the scanner cartridge 9 on the carriage 6, the carriage controller 17 detects an ID stored in the scanner cartridge 9 to recognize that the cartridge mounted on the carriage 6 is the scanner cartridge 9 (S603), and the scanner/printer 2 sends scanner start status as asynchronous status to the personal computer 1 (the scanner driver 20 in practice).

Figure 7:
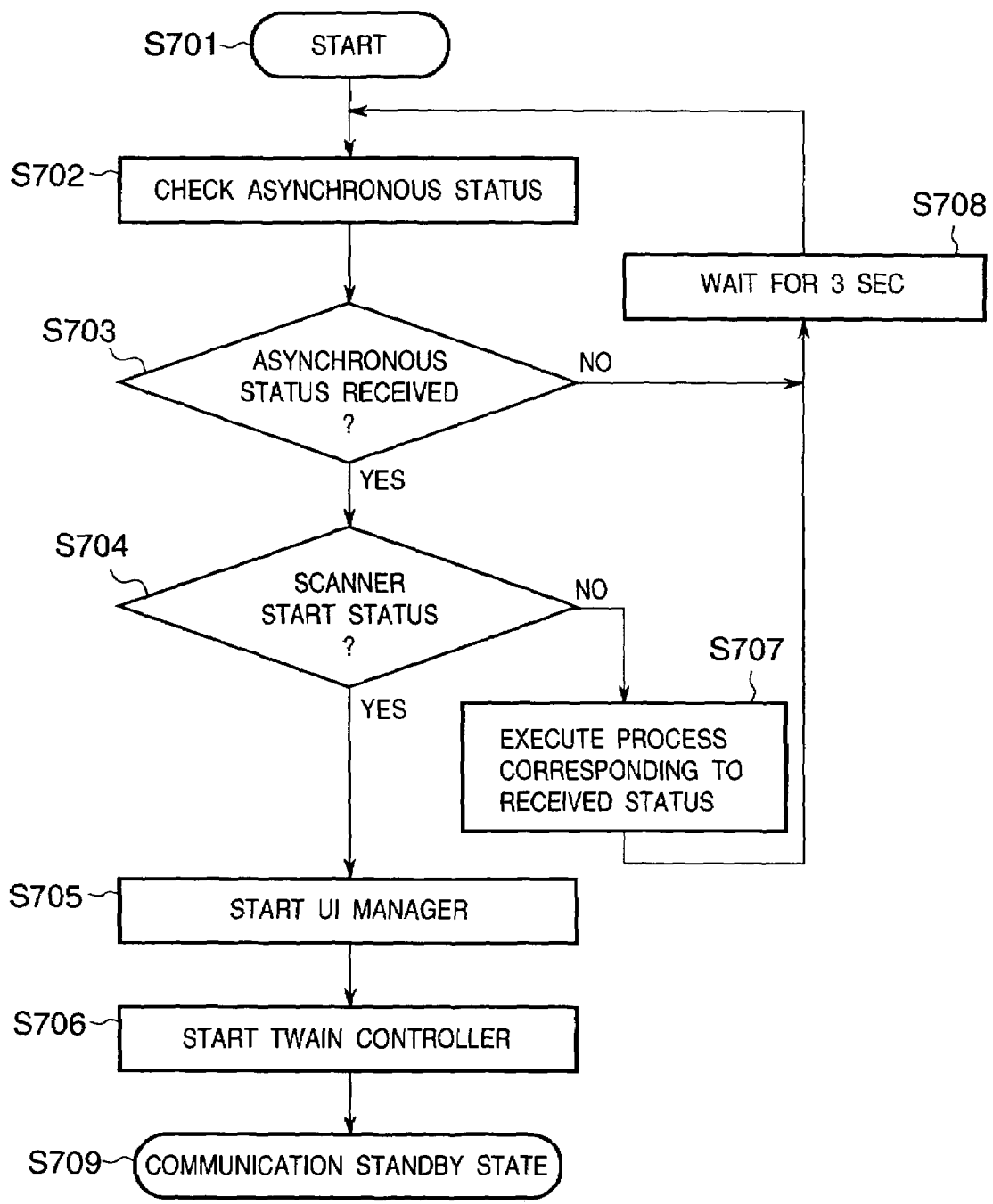
FIG. 7 is a flow chart showing operation in a port manager standby state.

FIG. 7 is a flow chart showing the operation in a port manager standby state. In the port manager standby state, only the port manager 22 of the scanner driver 20 is running (S701) after the OS is started (neither the UI manager 23 nor TWAIN controller 24 are started).

Referring to FIG. 7, if asynchronous status is detected (S703) upon checking the presence/absence of asynchronous status by controlling the port driver 21 (S702), and that asynchronous status is scanner start status (S704), the UI manager 23 is started (S705), the TWAIN controller 24 is started (S706), and the control enters a communication standby state (S709). If no asynchronous status is detected in step S703, the presence/absence of asynchronous status is checked again by controlling the port driver 21 (S702) after waiting for 3 sec. (S708). If it is determined in step S704 that the received status is not scanner start status, processing corresponding to the received status is executed (S707), and the presence/absence of asynchronous status is checked again by controlling the port driver 21 (S702) after waiting for 3 sec. (S708).

Figure 8:
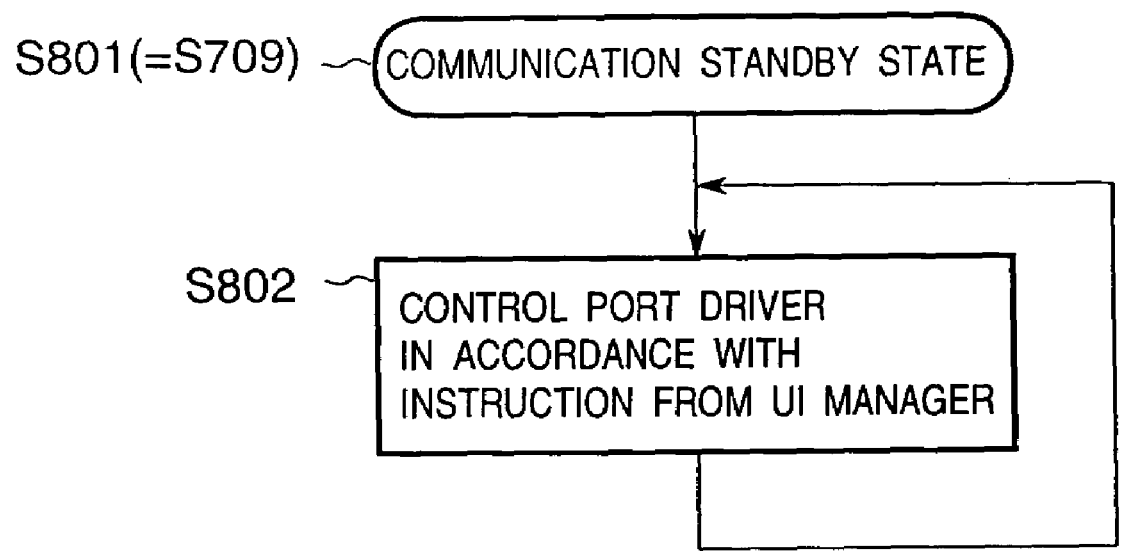
FIG. 8 is a flow chart showing operation of a port manager in a communication standby state.

FIG. 8 is a flow chart showing the operation of the port manager in the communication standby state. Referring to FIG. 8, if the port manager 22 is in the communication standby state (S801 (=S709)), the port driver 21 is controlled in accordance with an instruction from the UI manager 23 (S802).

Figure 9:
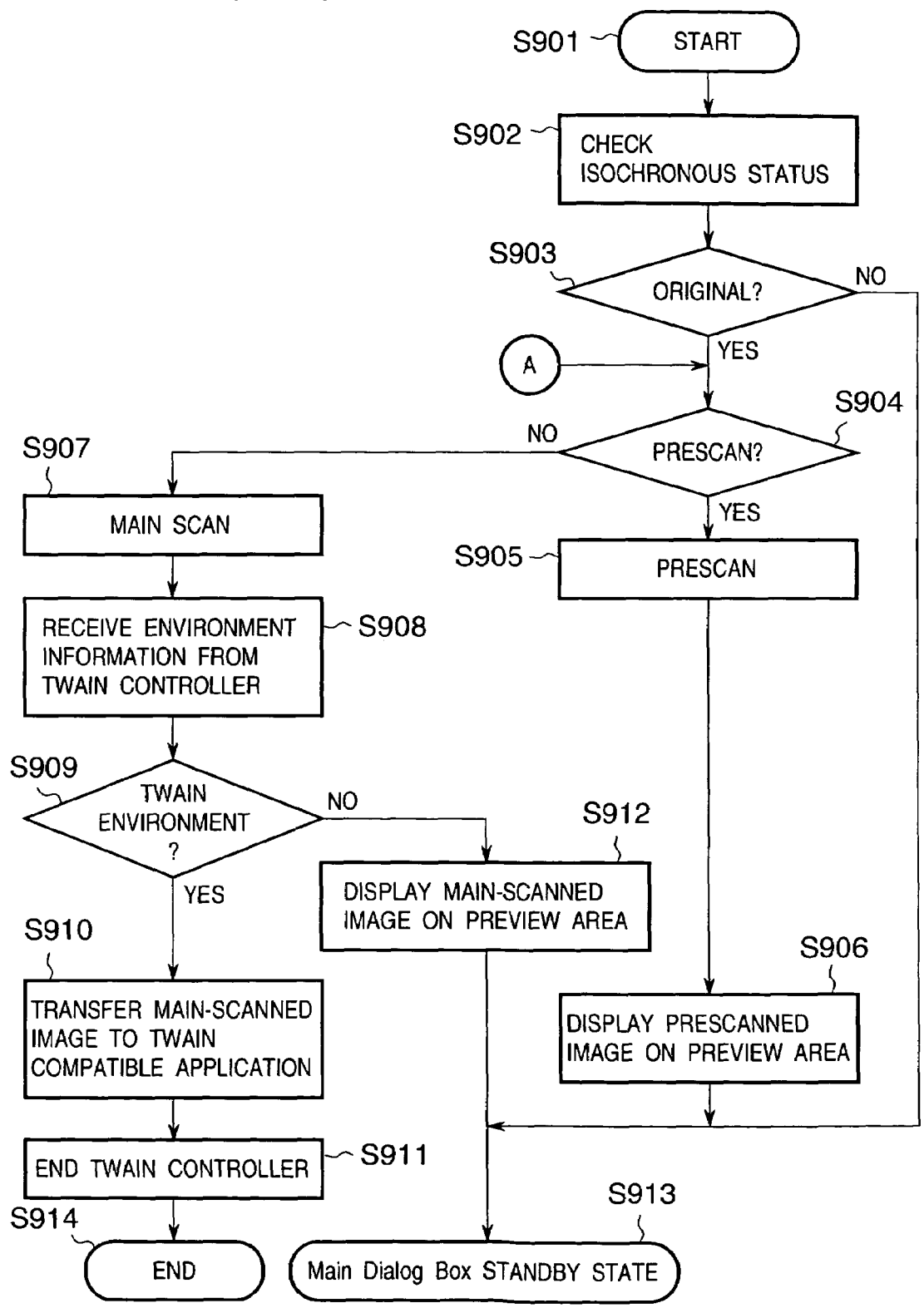
FIG. 9 is a flow chart showing operation upon starting a UI manager.

FIG. 9 is a flow chart showing the operation upon starting the UI manager. Referring to FIG. 9, if the UI manager 23 has been started (S901) in step S705 in FIG. 7, isochronous status sent back from the scanner/printer 2 in response to a status request command from the scanner driver 20 (from the UI manager 23 in practice) is checked (S902). If the received status indicates the presence of originals (S903) and the Prescan check box 37 is checked (S904), a prescan command is sent from the scanner driver 20 (the UI manager 23 in practice) to the scanner/printer 2 to prescan an image (S905).

After the prescan, a prescanned image is displayed on the preview area 27 on the basis of image data sent from the scanner/printer 2 to the scanner driver 20 (S906). After that, the control enters a Main Dialog Box standby state (S913).

If it is determined in step S904 that the Prescan check box 37 is not checked, a main scan command is sent from the scanner driver 20 (the UI manager 23 in practice) to the scanner/printer 2 to main-scan an image (S907).

After the main scan, environment information is received from the TWAIN controller 24 (S908). Under the assumption described previously, since the current environment is the TWAIN environment (S909), the main-scanned image is transferred to the TWAIN compatible application 25 (S910), thus ending the TWAIN controller 24 (S911) and the UI manager 23 (S914).

If it is determined in step S903 that the received status indicates the absence of originals, the control enters the Main Dialog Box standby state (S913).

Diverting from the assumption, the operations in the non-TWAIN environment in FIG. 9 will also be described. The operations from FIG. 6 to step S908 in FIG. 9 are the same as those in the TWAIN environment. After environment information is received from the TWAIN controller in step S908, since the current environment is the non-TWAIN environment (S909), the main-scanned image is displayed on the preview area 27 (S912), and the control enters the Main Dialog Box standby state (S913).

Figure 10:
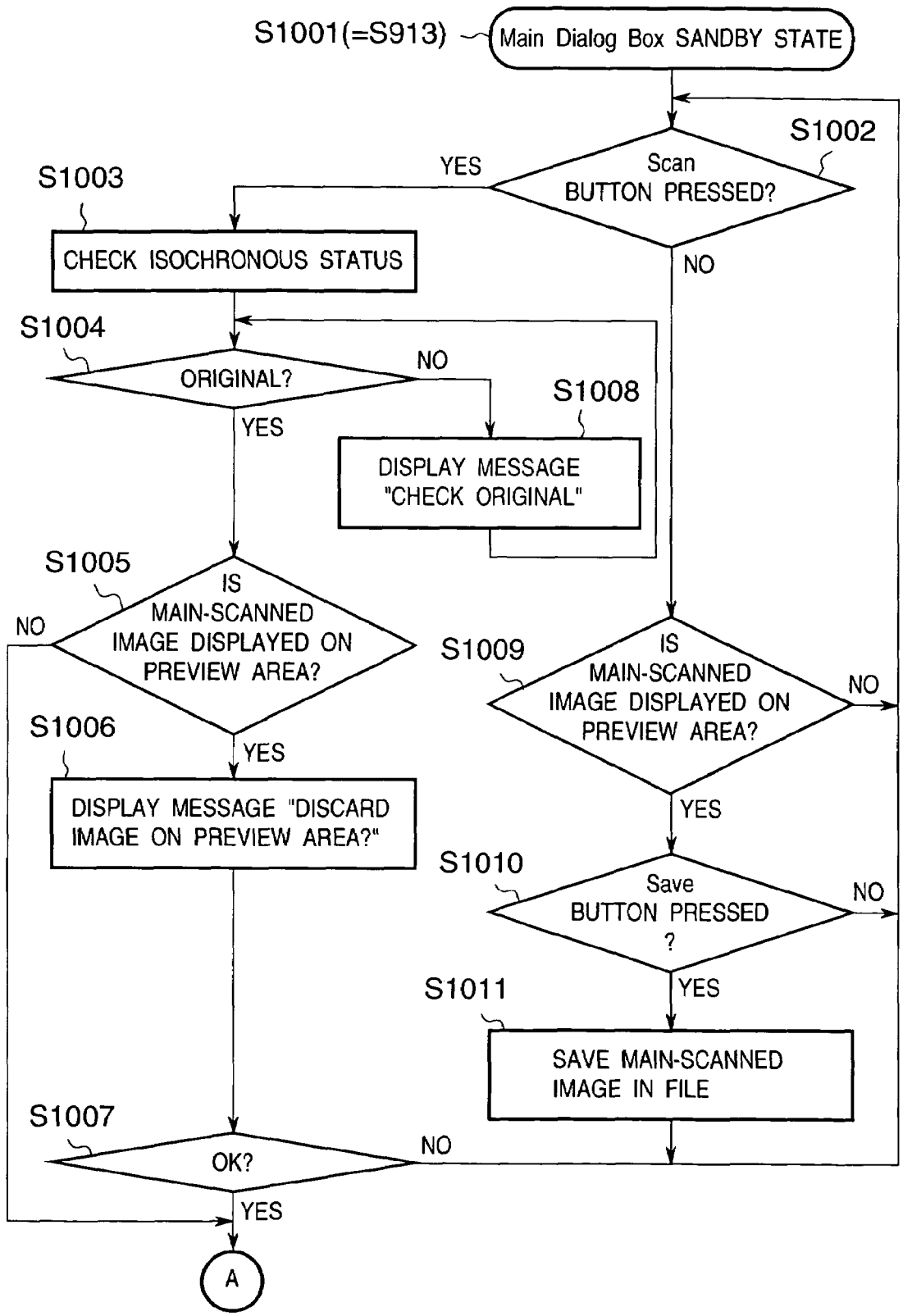
FIG. 10 is a flow chart showing operation in a Main Dialog Box standby state.

FIG. 10 is a flow chart showing the operation in the Main Dialog Box standby state. Referring to FIG. 10, if the Scan button 40 has been pressed (S1002) in the Main Dialog Box standby state (S1001), isochronous status sent back from the scanner/printer 2 in response to a status request command from the scanner driver 20 (UI manager 23 in practice) is checked (S1003). If the received status indicates the presence of originals (S1004) and a main-scanned image is displayed on the preview area (S1005), a message "discard image on preview area?" (a dialog box having "OK" and "cancel" buttons) is displayed (S1006). If the "OK" button is pressed on that message (S1007), the flow advances to node A in FIG. 9. If the "cancel" button is selected in step S1007, the flow returns to step S1002.

If it is determined in step S1005 that the main-scanned image is not displayed on the preview area, the flow advances to node A in FIG. 9.

If it is determined in step S1004 that the received status indicates the absence of originals, a message "check originals" (a dialog box having an "OK" button alone) is displayed (S1008), and the flow returns to step S1004 after the "OK" button is selected.

If it is determined in step S1002 that the Scan button 40 is not pressed, and a main-scanned image is displayed on the preview area (S1009), since the current environment is the TWAIN environment, as assumed above, and the Save button 39 goes gray-out and is invalid, the flow returns to step S1002.

If it is determined in step S1009 that a main-scanned image is not displayed on the preview area, the flow returns to step S1002.

Apart from the assumption, the operations in the non-TWAIN environment in FIG. 10 will also be described. The operations from FIG. 6 to FIG. 9 are as described above. In FIG. 10 as well, the operations up to step S1008 are the same as those in the TWAIN environment. If a main-scanned image is displayed on the preview area in step S1009 and the Save button 39 is pressed (S1010), the main-scanned image is saved in a file (S1011), and the flow returns to step S1002. If it is determined in step S1010 that the Save button 39 is not pressed, the flow returns to step S1002.

The operations in the respective states of this embodiment have been described. In this embodiment, when the scanner cartridge 9 is mounted on the carriage 6, scanner start status is sent as asynchronous status from the scanner/printer 2 to the personal computer 1 (the scanner driver 20 in practice), and the port manager 22 starts the UI manger 23 and TWAIN controller 23 upon detection of this status, thus starting all the modules of the scanner driver 20. Furthermore, when originals are set at that time, the UI manager 23 executes a prescan or main scan upon receiving isochronous status indicative of the presence of originals from the scanner/printer 2. After the main scan is done, if the environment at that time is the TWAIN environment, the UI manager 23 controls the TWAIN controller 24 to transfer the main-scanned image to the TWAIN compatible application 25.

In this manner, when the user mounts the scanner cartridge 9 on the scanner/printer 2, the scanner driver 20 is automatically started, and a main scan and automatic transfer to the application 25 are executed, resulting in very simple user operations. Since no special hardware switch or the like is required to implement such functions, implementation is very easy.

In this embodiment, Microsoft Windows95 is used as the OS. However, the present invention is not limited to such specific OS, and can be implemented under arbitrary OSs by adopting the same arrangement.

In this embodiment, TWAIN specified by the TWAIN Working group is used as the API between the application and image input device. However, the present invention is not limited to such specific API, and can be implemented using arbitrary APIs by adopting the same arrangement.

Furthermore, in this embodiment, the parallel interface that complies with IEEE P1284 as the standards for Standard Signaling Method for a Bi-directional Parallel Peripheral Interface for Personal Computers is used. However, the present invention is not limited to such specific interface, and can be implemented using arbitrary interfaces by adopting the same arrangement.

OTHER EMBODIMENTS

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, the following effects are obtained.

(1) User operation required to use the scanner function is very simple since he or she need only mount the scan head on the printer device.

(2) User operation required to scan an image is very simple since he or she need only prepare for originals and mount the scan head on the printer device.

When an application that can edit an image scanned via the printer device with the scanner function is running on the host computer upon starting the scanner driver, the scanner driver detects that environment, and executes control corresponding to the environment, thus obtaining the following effect.

(3) User operation required to make the application acquire an image is very simple since he or she need only start the application, prepare for originals, and mount the scan head on the printer device.

In order to simplify user operations, since no special hardware switch or the like is required, the following effects are obtained.

(4) No extra cost is required.

(5) Easy implementation is assured since neither a special mechanical arrangement nor electrical arrangement are required.

The present invention is not limited to the above embodiments and various changes and modifications can be made within the spirit and scope of the present invention. Therefore, to apprise the public of the scope of the present invention the following claims are made.

What is claimed is:

1. A scanning system comprising:
   a print device with a scanner function, which allows printing and scanning by selectively mounting a print head and a scan head on a head mounting portion, wherein said print device includes a first detector configured to detect that said scan head is mounted on said head mounting portion and a second detector configured to detect an original to be scanned in the scanning; and
   an external computer which is connected to said print device to be able to communicate therewith, and comprises a scanner software for controlling scanning operation of said print device,
   wherein said print device automatically communicates with said external computer to start said scanner software when said first detector detects that said scan head is mounted on said head mounting portion and provide an interface to a user, and to execute the scanning by said scan software when said second detector detects the original to be scanned in the scanning in a case that said first detector detects said scan head or a scanning start is instructed by the user via said interface.

2. The system according to claim 1, wherein said print device is designed to send a scanner start signal to said external computer when said scan head is mounted on said head mounting portion, said scanner software comprises a detection module for detecting the scanner start signal, said detection module alone in said scanner software is running in a standby state in which said printer device has not been started as a scanner, and modules other than said detection module in said scanner software are started when said detection module detects the scanner start signal.

3. The system according to claim 2, wherein when all the modules in said scanner software are running, said detection module uses a sufficiently small work area of said external computer compared to other modules.

4. The system according to claim 1, wherein said print head is an ink-jet print head.

5. The system according to claim 1, said scanner software further comprising a prescan selection module for selecting whether or not a prescan is made upon scanning the original, and wherein when said scanner software is started and it is selected by said prescan selection module that the prescan is to be made, an image of the original is prescanned and read into said scanner software.

6. The system according to claim 5, wherein said scanner software displays the prescanned and read image.

7. A scanning system according to claim 1, wherein said external computer further comprises an application software which can edit an image scanned by said print device, and said print device communicates with said external computer to transfer the read image to said application software.

8. The system according to claim 7, wherein said scanner software comprises an application software run detection module for detecting whether or not said application software is running.

9. A method of controlling a scanning system, which comprises a print device with a scanner function, which allows printing and scanning by selectively mounting a print head and a scan head on a head mounting portion, wherein said print device includes a first detector configured to detect that said scan head is mounted on said head mounting portion and a second detector configured to detect an original to be scanned in the scanning, and an external computer which is connected to said print device to be able to communicate therewith, and comprises a scanner software which can control scanning of said print device, comprising the step of:
   controlling said print device to automatically communicate with said external computer so as to start said scanner software when said first detector detects that said scan head is mounted on said head mounting portion and provide an interface to a user, and to execute the scanning by said scan software when said second detector detects the original to be scanned in the scanning in a case that said first detector detects said scan head or a scanning start is instructed by the user via said interface.

10. A method according to claim 9, wherein said external computer further comprises an application software which can edit an image scanned by said print device, and said print device is controlled to communicate with said external computer to transfer the read image to said application software in said controlling step.

11. A storage medium that stores a control program for controlling a scanning system, which comprises a print device with a scanner function, which allows printing and scanning by selectively mounting a print head and a scan head on a head mounting portion, wherein said print device includes a first detector configured to detect that said scan head is mounted on said head mounting portion and a second detector configured to detect an original to be scanned in the scanning, and an external computer which is connected to said print device to be able to communicate therewith, and comprises a scanner software which can control scanning of said print device, said control program comprising:
   a code of the step of controlling said print device to automatically communicate with said external computer so as to start said scanner software when said first detector detects that said scan head is mounted on said head mounting portion and provide an interface to a user, and to execute the scanning by said scan software when said second detector detects the original to be scanned in the scanning in a case that said first detector detects said scan head or a scanning start is instructed by the user via said interface.

12. A storage medium according to claim 11, wherein said external computer further comprises an application software which can edit an image scanned by said print device, and said print device is controlled to communicate with said external computer to transfer the read image to said application software in said controlling step.

* * * * *